(12) United States Patent
Staempfle et al.

(10) Patent No.: US 8,818,694 B2
(45) Date of Patent: Aug. 26, 2014

(54) METHOD FOR DETECTING A TRAFFIC ZONE

(75) Inventors: Martin Staempfle, Schwieberdingen (DE); Jan-Carsten Becker, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 994 days.

(21) Appl. No.: 11/990,730

(22) PCT Filed: Jul. 21, 2006

(86) PCT No.: PCT/EP2006/064534
§ 371 (c)(1),
(2), (4) Date: Mar. 24, 2009

(87) PCT Pub. No.: WO2007/020153
PCT Pub. Date: Feb. 22, 2007

(65) Prior Publication Data
US 2009/0326752 A1  Dec. 31, 2009

(30) Foreign Application Priority Data
Aug. 18, 2005  (DE) .......................... 10 2005 039 103

(51) Int. Cl.
*G08G 1/00*    (2006.01)

(52) U.S. Cl.
USPC ......................................... 701/118; 701/117

(58) Field of Classification Search
USPC ......................................... 701/117, 118, 119
See application file for complete search history.

(56) References Cited

U.S. PATENT DOCUMENTS

| | | | | |
|---|---|---|---|---|
| 5,369,591 A * | 11/1994 | Broxmeyer | .................... | 701/301 |
| 5,467,283 A * | 11/1995 | Butsuen et al. | ............... | 701/301 |
| 5,479,173 A * | 12/1995 | Yoshioka et al. | ............... | 342/70 |
| 5,483,453 A * | 1/1996 | Uemura et al. | ................. | 701/23 |
| 5,739,848 A * | 4/1998 | Shimoura et al. | ............. | 348/119 |
| 5,745,870 A * | 4/1998 | Yamamoto et al. | ........... | 701/301 |
| 5,884,212 A * | 3/1999 | Lion | ............................. | 701/117 |
| 5,959,569 A * | 9/1999 | Khodabhai | .................... | 342/70 |
| 6,252,520 B1 * | 6/2001 | Asami et al. | .................. | 340/903 |
| 6,311,123 B1 | 10/2001 | Nakamura et al. | | |
| 6,405,132 B1 * | 6/2002 | Breed et al. | .................... | 701/301 |
| 6,429,789 B1 * | 8/2002 | Kiridena et al. | ............. | 340/905 |
| 6,615,137 B2 * | 9/2003 | Lutter et al. | .................. | 701/301 |
| 6,805,216 B2 * | 10/2004 | Noecker | ......................... | 180/170 |
| 6,859,705 B2 * | 2/2005 | Rao et al. | ........................ | 701/45 |
| 7,038,577 B2 * | 5/2006 | Pawlicki et al. | ............. | 340/435 |
| 7,085,637 B2 * | 8/2006 | Breed et al. | .................... | 701/38 |
| 7,110,880 B2 * | 9/2006 | Breed et al. | .................. | 701/207 |
| 7,295,925 B2 * | 11/2007 | Breed et al. | .................. | 701/301 |
| 7,386,371 B2 * | 6/2008 | Kuge et al. | ....................... | 701/1 |
| 7,418,346 B2 * | 8/2008 | Breed et al. | .................. | 701/301 |
| 7,418,372 B2 * | 8/2008 | Nishira et al. | .................... | 703/2 |
| 7,440,823 B2 * | 10/2008 | Yamamura et al. | ............... | 701/1 |

(Continued)

FOREIGN PATENT DOCUMENTS

| | | |
|---|---|---|
| DE | 695 14 506 | 5/2000 |
| EP | 1 413 500 | 4/2004 |
| WO | WO 95/28653 | 10/1995 |

*Primary Examiner* — David E Allred
(74) *Attorney, Agent, or Firm* — Kenyon & Kenyon LLP

(57) ABSTRACT

A method for detecting a traffic zone using an on-board sensor system. Objects from the surroundings of the host vehicle are detected using the sensor system. The course of the traffic lanes is derived from the performance characteristics of the objects detected by the sensors.

19 Claims, 2 Drawing Sheets

(56) References Cited

U.S. PATENT DOCUMENTS

| | | | |
|---|---|---|---|
| 7,593,838 B2* | 9/2009 | Winter et al. | 703/8 |
| 7,617,037 B2* | 11/2009 | Desens et al. | 701/96 |
| 7,791,503 B2* | 9/2010 | Breed et al. | 340/993 |
| 7,835,854 B2* | 11/2010 | Yamamoto et al. | 701/117 |
| 7,848,884 B2* | 12/2010 | Kawasaki | 701/301 |
| 7,848,886 B2* | 12/2010 | Kawasaki | 701/301 |
| 7,860,639 B2* | 12/2010 | Yang | 701/117 |
| 7,899,621 B2* | 3/2011 | Breed et al. | 701/301 |
| 7,925,425 B2* | 4/2011 | Tomita et al. | 701/118 |
| 7,979,172 B2* | 7/2011 | Breed | 701/23 |
| 7,979,173 B2* | 7/2011 | Breed | 701/23 |
| 7,991,550 B2* | 8/2011 | Zeng | 701/301 |
| 8,046,166 B2* | 10/2011 | Cabral et al. | 701/461 |
| 8,055,428 B2* | 11/2011 | Okawa | 701/96 |
| 8,073,575 B2* | 12/2011 | Tachibana et al. | 701/1 |
| 2003/0060969 A1 | 3/2003 | Waite et al. | |
| 2005/0096838 A1 | 5/2005 | Jung | |
| 2006/0006988 A1* | 1/2006 | Harter et al. | 340/435 |
| 2006/0047409 A1* | 3/2006 | Oka | 701/117 |
| 2006/0047410 A1* | 3/2006 | Oka | 701/117 |
| 2006/0064233 A1* | 3/2006 | Adachi et al. | 701/117 |
| 2006/0064236 A1* | 3/2006 | Hayashi | 701/117 |
| 2006/0095195 A1* | 5/2006 | Nishimura et al. | 701/96 |
| 2006/0152346 A1* | 7/2006 | Maass et al. | 340/425.5 |
| 2007/0027583 A1* | 2/2007 | Tamir et al. | 701/1 |
| 2007/0038361 A1* | 2/2007 | Yavitz et al. | 701/117 |
| 2007/0067081 A1* | 3/2007 | Ton | 701/41 |
| 2007/0083322 A1* | 4/2007 | Van Ee | 701/117 |
| 2007/0088488 A1* | 4/2007 | Reeves et al. | 701/117 |
| 2007/0142995 A1* | 6/2007 | Wotlermann | 701/96 |
| 2007/0198188 A1* | 8/2007 | Leineweber et al. | 701/300 |
| 2008/0040023 A1* | 2/2008 | Breed et al. | 701/117 |
| 2008/0154629 A1* | 6/2008 | Breed et al. | 705/1 |
| 2008/0215231 A1* | 9/2008 | Breed | 701/117 |
| 2008/0215232 A1* | 9/2008 | Ikeda et al. | 701/117 |
| 2009/0033540 A1* | 2/2009 | Breed et al. | 342/29 |
| 2009/0051516 A1* | 2/2009 | Abel et al. | 340/436 |
| 2010/0191449 A1* | 7/2010 | Iwamoto | 701/118 |
| 2010/0201508 A1* | 8/2010 | Green et al. | 340/435 |
| 2010/0228467 A1* | 9/2010 | Wolfe | 701/119 |
| 2010/0324806 A1* | 12/2010 | Ishikawa | 701/119 |
| 2013/0282271 A1* | 10/2013 | Rubin et al. | 701/423 |

* cited by examiner

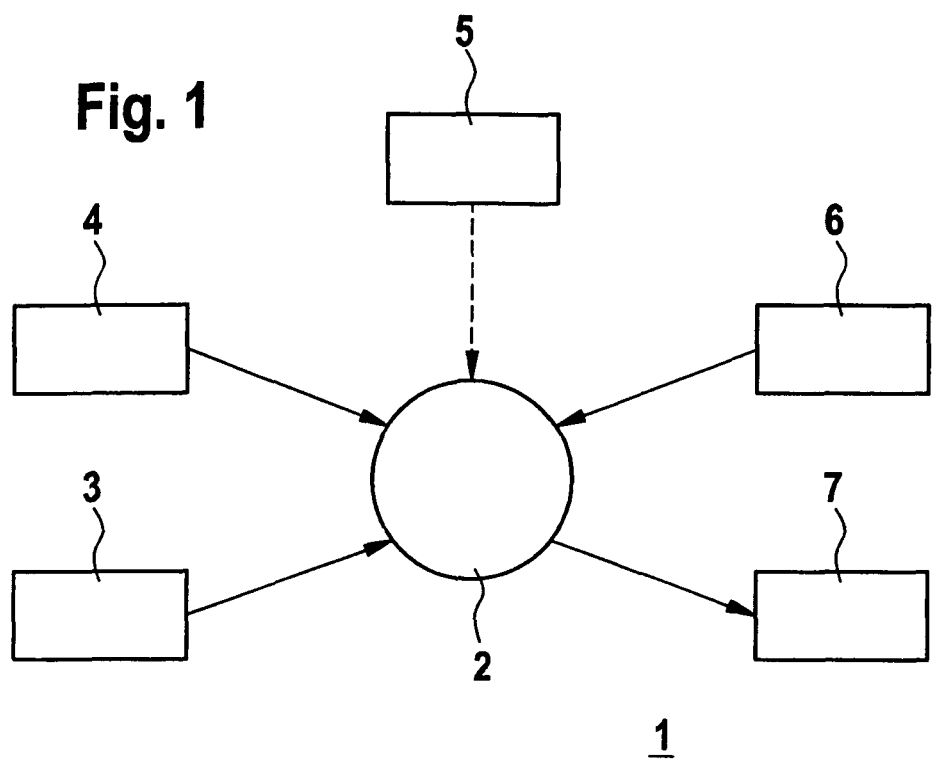
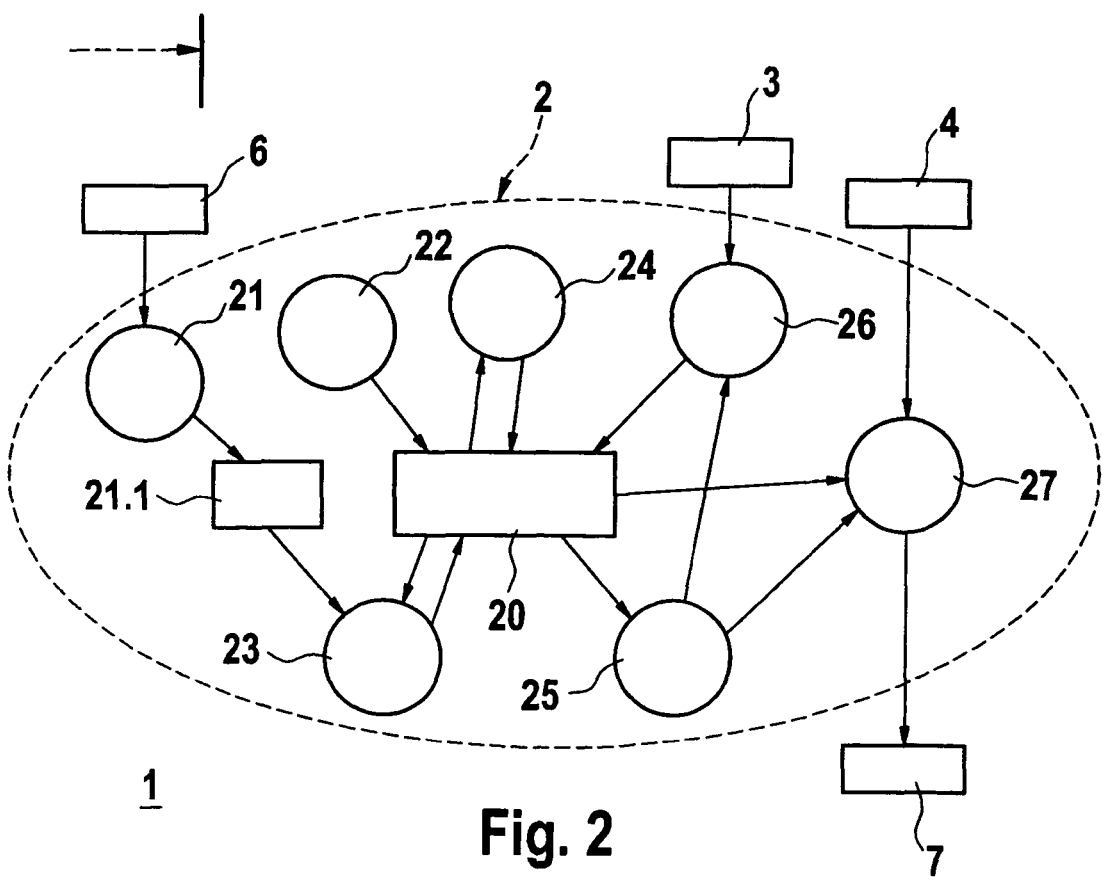

METHOD FOR DETECTING A TRAFFIC ZONE

FIELD OF THE INVENTION

The present invention relates to a method for detecting a traffic zone.

BACKGROUND INFORMATION

Traffic zone, as understood in this application, refers to those areas of the road and the users moving on it which are detectable by the driver of a vehicle, in particular with the aid of optical and electronic aids. Currently, environment sensors such as ultrasonic sensors, radar sensors, mono or stereo video sensors, or laser scanners in different configurations are used for detecting the traffic zone. Suitable sensor configurations are derived from the particular requirements of the downstream driver assistance systems.

The configurations differ by type, number, and arrangement of the individual sensors and sensor clusters used. Currently the sensor data are used mainly directly for the driving functions. Thus, in ACC (Adaptive Cruise Control), the distance and relative velocity with respect to the preceding vehicle are used for following it at a constant time interval. No further analysis of the available signals is performed. The driving environment is not described in detail at this time. The data delivered by the sensors are not fully analyzed. If the data are suitably combined, additional information results, and may be of additional use if appropriately processed.

SUMMARY OF THE INVENTION

An object of the exemplary embodiments and/or exemplary methods of the present invention is to provide information about the number of traffic lanes on the road surface and the direction of movement of the vehicles in the traffic lanes. In addition, the method should make an average velocity for each detected traffic lane available. For example, five traffic lanes are detected; three to the left of the host vehicle's lane, the host vehicle's lane, and one traffic lane to the right of the host vehicle's lane. Oncoming vehicles are moving on the two traffic lanes farthest to the left; vehicles moving in the same direction as the host vehicle are on the three traffic lanes farthest to the right, including the host vehicle's lane. In addition, an average velocity is calculated for each of these five traffic lanes. The exemplary embodiments and/or exemplary methods of the present invention therefore relates to a method for determining the number of traffic lanes, for determining the directions of travel, and for determining the average velocities on the individual traffic lanes. Furthermore, an interface is provided which displays the generated information about the traffic flow to the driver in a suitable manner. Another interface is provided which conveys the information to driver assistance systems.

The information about the traffic flow may be made available to the driver via a suitable display. The driver may use this additional information in planning his route, thus obtaining additional use of the installed sensor system. Downstream driver assistance systems may use the information about the traffic flow. In the event of a lane change or deviation to an adjacent traffic lane, the knowledge of the direction of travel is valuable information (for example, for a possible warning). The method according to the present invention allows a driver assistance system having enhanced usefulness to the driver to be implemented. The course of the traffic lanes may thus be recognized even on roads without markings. If the host vehicle intends to make a lane change to a traffic lane on which oncoming traffic has been previously detected, a warning may be output for the driver. By comparing the average velocities on adjacent traffic lanes, the driver may be given a suggestion for a lane change. In the case of driver assistance systems having collision warning, the possibility of a risky evasive path leading into the oncoming traffic may be ignored. Instead, an earlier warning or a more intensive braking operation may be considered. In the event of failure of sensors provided for lane recognition via road marking detection, the method according to the present invention may continue to recognize traffic lanes and thus virtually generated traffic lane markings. In road construction areas in particular, there are often no or only hardly recognizable markings. In this case, too, the method according to the present invention may provide a full-value substitute for detection of traffic lane markings by detecting traffic lanes on the basis of the traffic flow.

The present invention is elucidated in detail below with reference to the drawings.

BRIEF DESCRIPTION OF THE DRAWINGS

FIG. 1 shows a block diagram of a system for detecting a traffic zone.

FIG. 2 shows a data flow chart.

DETAILED DESCRIPTION

Figure 4:
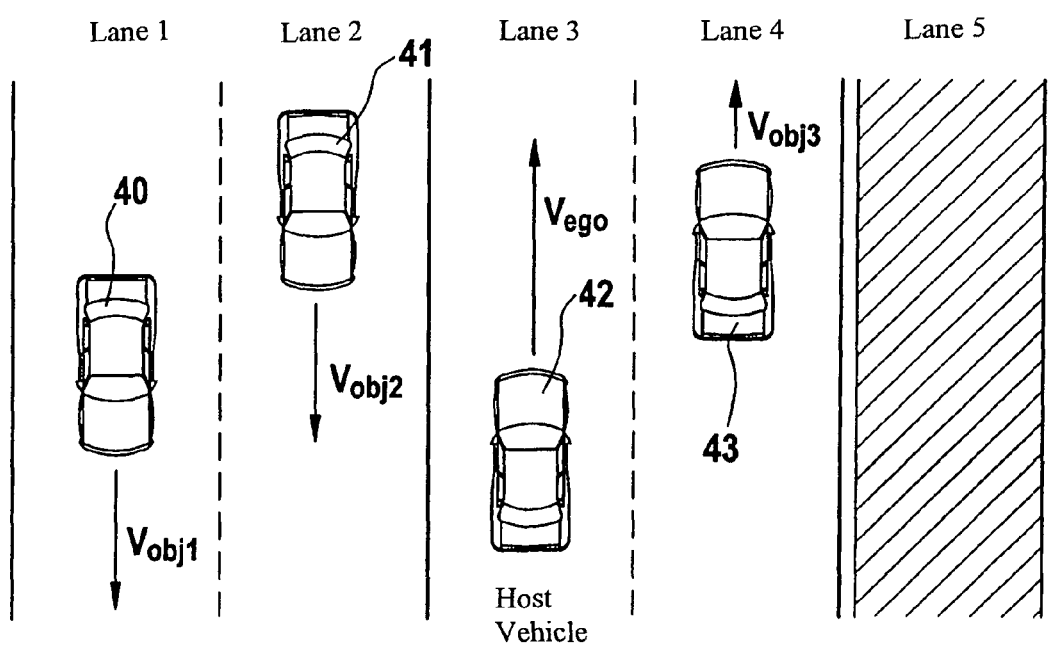
FIG. 4 shows a traffic zone from a bird's eye perspective.

FIG. 4 shows a traffic zone 10 from a bird's eye perspective as an example. Roadways FB1 (lane 1, lane 2), FB2 (lane 3, lane 4) having a plurality of traffic lanes: lane 1, lane 2, lane 3, lane 4 are shown, and a traffic lane 5, which may be used for stationary vehicles. Vehicles 42, 43 on traffic lanes lane 3 and lane 4 move northward, for example. Host vehicle 42 moves on traffic lane 3. Vehicles 40, 41 on roadway FB1 (lane 1, lane 2) move in the opposite direction. The fields of application for the method according to the present invention may be superhighways, federal roads, and country roads. Urban thoroughfares and feeder roads to the above-mentioned road types are road types on which the method according to the present invention may be advantageously used.

The method basically works with any on-board surroundings sensors capable of detecting objects in the detectable traffic zone. Radar sensors (close-range and long-range), video sensors (mono and stereo sensors), and laser scanners are advantageously used. The method works exclusively with moving objects. Stationary objects are filtered out in an input stage of the system executing the method. This advantageously prevents construction along the road's edges from being included in the detection of traffic lanes. However, traffic lanes used exclusively for stationary vehicles such as the traffic lane labeled lane 5 in FIG. 4 are consequently not recognized. An empty superhighway on which there are no moving vehicles also does not result in recognition of traffic lanes using the method according to the present invention.

At this time, there are no approaches applicable in practice for the above-mentioned cases. The exemplary embodiments and/or exemplary methods of the present invention is directed to a model for describing the traffic lanes. The parameters used include in particular the number of traffic lanes and the width of the traffic lanes. The model for detecting the traffic flow in the surroundings of the vehicle is based on the assumption that in general there is a plurality of traffic lanes, a maximum number of traffic lanes $n_{max}$ being assumed. Parameters of the model include, in particular the widths of the individual traffic lanes having a discrete, finite range of values such as widths between 2.00 m and 4.00 m;

the direction of travel of the vehicles on the detected traffic lanes having a discrete, binary range of values, for example, [−1,1];

the average velocity of the vehicles on the detected traffic lanes having a continuous range of values, for example, the velocity interval between −200 km/h and 200 km/h.

Determining an optimum set of parameters for the model is an important task. The set of parameters is optimum when it describes reality in the best possible manner. This optimization problem is solved in each cycle that is triggered by new sensor data. New sensor data are ascertained every 100 ms, for example. The data are advantageously ascertained in two stages. In a first stage the optimum widths of the traffic lanes are determined (function modules 23, 24, 25). In a subsequent second stage, the direction of travel and the average velocity are determined on the particular traffic lanes (function module 26).

In order to avoid strong oscillations of the result, all output quantities are advantageously low-pass filtered (function module 27). Since the resulting information is not used for maneuvers that are critical for the driving physics or for time-critical decisions, filtration with a rather large time constant is recommended. Erroneous individual models are thus reliably filtered out and relatively stable traffic lane information is obtained. The model information is stored in a matrix (function module 20). The matrix has $n_{max}$ columns. One column is provided for each traffic lane. Each row of the matrix contains a possible traffic lane width combination. A matrix element describes the plausibility that a certain traffic lane has a certain width. The matrix is recalculated in each cycle. At the beginning of each cycle, stationary objects are filtered out (function module 21). Stationary vehicles cannot be differentiated from construction along the road's edge and are therefore not used for determining the traffic lanes.

Moving objects detected by the sensors of the host vehicle, thus in particular other vehicles 40, 41, 43 from traffic zone 10, are assigned to traffic lanes lane 1, lane 2, and lane 4 ascertained using the model. The plausibility for the existence of the particular lane increases with each assignment of this type. The currently valid model is the most plausible one, which is also output. If such road markings are also recognized by a sensor that is sensitive to road markings, this information advantageously flows into the parameterization of the traffic lane parameters according to the model. The lane width of the traffic lane may thus be detected directly via sensor detection and therefore need not be ascertained as a model parameter. The block diagram shown in FIG. 1 of a system 1 for detecting a traffic zone explains how the method according to the present invention is embedded into the overall driver assistance system.

The method according to the present invention is also known as "SIL" (Situation Interpretation Lane). The method according to the present invention is executed in the function module labeled with reference numeral 2. The input of function module 2 is connected to function modules 3, 4, 5, and 6. Function module 3 provides performance characteristics of the host vehicle (reference numeral 42 in FIG. 4), such as the velocity, the yaw rate, the steering angle, and the transverse acceleration. Function module 4 provides the current time. Function module 5 contains a sensor data fusion (SDF). Function module 5 synchronizes the sensor data from function module 6 and makes consistent objects from the vehicle surroundings available to function module 2. Function module 6 provides data of the objects detected by sensors in traffic zone 10. The output of function module 2 is connected to a function module 7. Function module 7 provides the result of the method according to the present invention. The individual method steps running essentially in function module 2 of system 1 will now be illustrated in detail with reference to the flow diagram illustrated in FIG. 2.

The sequence of the processing is illustrated by the arrows drawn in function module 2. Function module 2 in turn includes additional function modules 20, 21, 22, 23, 24, 25, 26, 27. Most of these function modules, namely function modules 22, 23, 24, 25, 26, 27 are connected to function module 20. Only function module 21 is not connected to function module 22, but to function module 23. Function module 6 is connected to function module 21 within function module 2. Function module 3 is connected to a function module 26. Function module 4 is connected to a function module 27. Function module 7 is connected to a function module 27. In the following, the functional relationship of the function modules and the sequence of the method steps are further elucidated. Data of objects that have been detected by sensors of host vehicle 42 in traffic zone 10 covered by the sensors are supplied to function module 21 via function module 6. The object data are selected in function module 21. Stationary objects are eliminated, and only the data of moving objects are relayed to a function module 21.1. Interfering data from construction along the road's edge and the like are thus advantageously eliminated.

A list of the objects provided by this selection is prepared in function module 21.1. The lateral positions of the detected objects with respect to host vehicle 42 are also contained in this list. As mentioned previously, the method according to the present invention depends on a model of the traffic zone covered. In particular, lane widths of the traffic lanes of the covered traffic zone are prepared in function module 22 and supplied to function module 20. The prepared values of the lane widths are also supplied, via function module 20, to function module 23, where the lanes described as a model are weighted and the weighted data are in turn returned to function module 20.

The existence of the traffic lanes detected by the sensors is checked on the basis of the weighted lane data in function module 24. In function module 25, a plausibility check is performed on the basis of the weighted lane data, and the most plausible model of the traffic lanes is computed. This is then conveyed to function modules 26 and 27. The average velocity of the objects moving on a traffic lane and their direction of travel are ascertained in function module 26, which is also connected to function module 3 and receives data of the host vehicle therefrom. The result is relayed to function module 20. In function module 27, the data about the calculated traffic lanes and the most plausible models are combined and transmitted as output information to function module 7.

Figure 3:
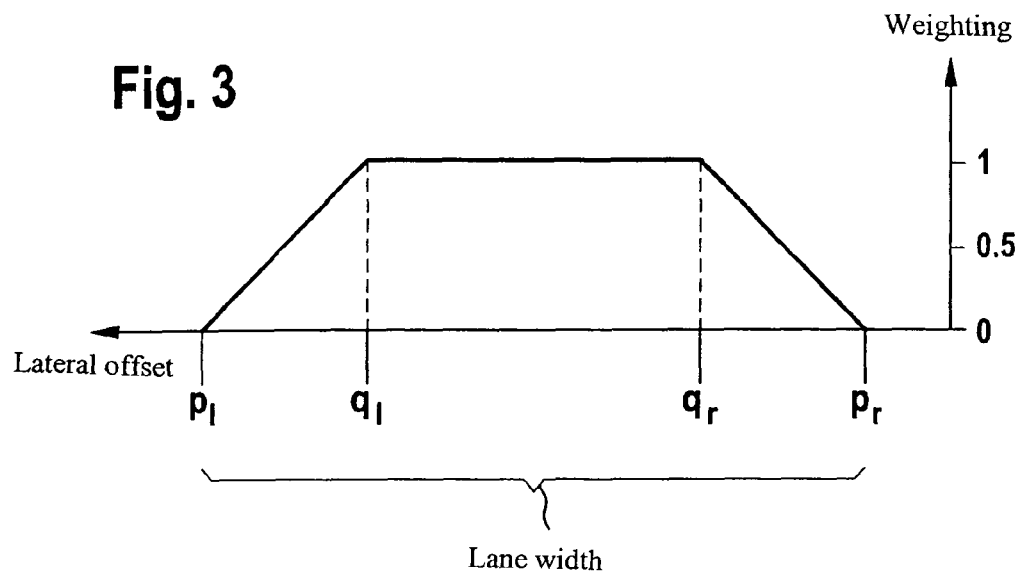
FIG. 3 shows a weighting function.

The diagram of FIG. 3 represents a weighting function which is advantageously used in function module 23 for weighting the traffic lanes. The lateral offset of an object in relation to host vehicle 42, detected by the sensors (e.g., vehicles 40, 41, 43 in FIG. 4), is plotted on the x axis of the diagram. A weighting factor is plotted on the y axis of the diagram. The weighting factor describes the plausibility of the assignment of a detected object to a certain traffic lane. The diagram shows that detected objects having a lateral offset between values $q_r$ and $q_l$ receive a weighting factor 1. Detected objects having a lateral offset between $p_r$ and $q_r$ as well as between $p_l$ and $q_l$ receive a weighting factor between 0 and 1. The distance between lateral offsets $p_r$ and $p_l$ is defined as the lane width. The result achieved using the method according to the present invention is now elucidated again with reference to the above-mentioned FIG. 4, which shows a traffic zone from a bird's eye perspective.

The host vehicle is labeled with reference number 42. The traffic lanes detected using the method according to the present invention on which objects, i.e., vehicles 40, 41 as illustrated here, move in the opposite direction of the host vehicle, are labeled "−1." The traffic lanes detected using the method according to the present invention on which objects, i.e., here other vehicle 43 and host vehicle 42, move in the same direction as host vehicle 42, are labeled "1." A traffic lane that has not been detected is labeled "0." This may be an empty lane or an emergency lane on which there are only stationary objects. The model on which the method is based thus includes a total of five traffic lanes, four of which have been recognized as existing. The information about the traffic zone gained using the method according to the present invention is advantageously made visible to the driver via a suitable display. For example, the data may be displayed in a window of a multi-instrument or on the monitor of a navigation system already present in the vehicle. The number of detected traffic lanes may also be advantageously represented in a convenient manner in the form of appropriate symbols.

The direction of travel of the objects on the traffic lanes may be advantageously represented via arrows as in FIG. 4. In addition, the average velocity on the individual traffic lanes may also be advantageously shown either numerically or symbolically via appropriate lengths of the arrows used for displaying the direction of travel.

The method according to the present invention allows a driver assistance system having considerably enhanced usefulness to the driver to be implemented. The course of the traffic lanes may thus be recognized even on roads without markings. If the host vehicle intends to make a lane change to a traffic lane on which oncoming traffic has been previously detected (for example, change from lane 3 to lane 2 in FIG. 4), a warning may be output for the driver. By comparing the average velocities on adjacent traffic lanes (for example, lane 3 and lane 4 in FIG. 4), the driver may be given a suggestion for a traffic lane change. Furthermore, a recommendation for a lane change may advantageously be given if a lower vehicle density has been detected on the adjacent traffic lane.

With driver assistance systems having collision warning, the possibility of a risky evasive maneuver leading into the oncoming traffic may be ignored. Instead, an earlier warning or a more intensive braking operation may be considered. In the event of failure of sensors provided for lane recognition by road marking detection, the method according to the present invention may continue to recognize traffic lanes and thus virtually generated traffic lane markings. In particular in construction areas there are often no or only hard-to-recognize markings. In this case, too, the method according to the present invention may provide a full-value substitute for detection of traffic lane markings by detecting traffic lanes on the basis of the traffic flow.

What is claimed is:

1. A method for detecting a traffic zone using an on-board sensor system, the method comprising:
    detecting objects from surroundings of a host vehicle;
    deriving a course of traffic lanes from performance characteristics of the objects detected by the sensors;
    comparing the direction of travel of the host vehicle to a direction of travel of objects in adjacent traffic lanes; and
    generating, in the event of a lane change of the host vehicle to a traffic lane carrying oncoming traffic, at least one warning;
    wherein a number of objects traveling in a same direction on adjacent traffic lanes is detected, and a recommendation for a lane change to an adjacent lane is provided if a lower number of objects is detected there.

2. The method of claim 1, wherein a direction of travel, a velocity, and a lateral offset with respect to the host vehicle are detected as the performance characteristics of the objects.

3. The method of claim 1, wherein an average velocity is determined for each of the traffic lanes.

4. The method of claim 1, wherein the velocity of the host vehicle is compared with the average velocity of the objects traveling in the same direction on adjacent traffic lanes and a recommendation for a lane change to an adjacent lane occurs if a higher average velocity of the objects is detected there.

5. The method of claim 1, wherein a lateral distance of an object to the host vehicle, as detected by a sensor, is weighted using a weighting factor.

6. The method of claim 5, wherein the weighting factor is between 0 and 1, the weighting factor of 1 being assigned to a lateral distance in an interval between $q_r$ and $q_l$ and the weighting factor of 0 being assigned to edges of a traffic lane predefined as a model.

7. The method of claim 1, wherein the traffic lane information is shown on a display device.

8. The method of claim 1, wherein a direction of travel, a velocity, and a lateral offset with respect to the host vehicle are detected as the performance characteristics of the objects, wherein an average velocity is determined for each of the traffic lanes.

9. The method of claim 8, wherein the velocity of the host vehicle is compared with the average velocity of the objects traveling in the same direction on adjacent traffic lanes and a recommendation for a lane change to an adjacent lane occurs if a higher average velocity of the objects is detected there.

10. The method of claim 8, wherein a lateral distance of an object to the host vehicle, as detected by a sensor, is weighted using a weighting factor, and wherein the weighting factor is between 0 and 1, the weighting factor of 1 being assigned to a lateral distance in an interval between $q_r$ and $q_l$ and the weighting factor of 0 being assigned to edges of a traffic lane predefined as a model.

11. The method of claim 8, wherein the traffic lane information is shown on a display device.

12. The method of claim 1, wherein output quantities are low-pass filtered by a low-pass filter function module, so that erroneous individual models are filtered out to obtain relatively stable traffic lane information.

13. The method of claim 12, wherein stationary objects are filtered out.

14. The method of claim 1, wherein stationary objects are filtered out.

15. A driver assistance system, comprising:
    a system arrangement including:
        a time detection function module to provide time detection;
        a performance characteristics function module to detect performance characteristics of the host vehicle;
        an object data function module to detect object data from a traffic zone;
        a modeled traffic lane function module to determine a modeled traffic lane; and
        a traffic lane information function module to provide traffic lane information;
    wherein the system arrangement is operable to:

detect a traffic zone using an on-board sensor system having sensors by deriving a course of the traffic lanes from the performance characteristics of the objects detected by the sensors, compare the direction of travel of the host vehicle to a direction of travel of objects in adjacent traffic lanes, generate at least one warning in the event that the host vehicle changes lanes to a traffic lane carrying oncoming traffic, and detect a number of objects traveling in a same direction on adjacent traffic lanes and provide a recommendation for a lane change to an adjacent lane if a lower number of objects is detected there.

16. The driver assistance system of claim 15, wherein a direction of travel, a velocity, and a lateral offset with respect to the host vehicle are detected as the performance characteristics of the objects, wherein an average velocity is determined for each of the traffic lanes.

17. The driver assistance system of claim 16, wherein the velocity of the host vehicle is compared with the average velocity of the objects traveling in the same direction on adjacent traffic lanes and a recommendation for a lane change to an adjacent lane occurs if a higher average velocity of the objects is detected there.

18. The driver assistance system of claim 16, wherein a lateral distance of an object to the host vehicle, as detected by a sensor, is weighted using a weighting factor, and wherein the weighting factor is between 0 and 1, the weighting factor of 1 being assigned to a lateral distance in an interval between $q_r$ and $q_l$ and the weighting factor of 0 being assigned to edges of a traffic lane predefined as a model.

19. The driver assistance system of claim 16, wherein the traffic lane information is shown on a display device.

* * * * *